(12) United States Patent
Ishii

(10) Patent No.: US 8,294,845 B2
(45) Date of Patent: Oct. 23, 2012

(54) CABINET STRUCTURE FOR DISPLAY APPARATUS

(75) Inventor: Hiroki Ishii, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 357 days.

(21) Appl. No.: 12/700,364

(22) Filed: Feb. 4, 2010

(65) Prior Publication Data

US 2010/0201905 A1  Aug. 12, 2010

(30) Foreign Application Priority Data

Feb. 6, 2009  (JP) ................................ 2009-025602

(51) Int. Cl.
*G02F 1/1333* (2006.01)

(52) U.S. Cl. ........................................................ 349/60

(58) Field of Classification Search ................. 349/58, 349/60

See application file for complete search history.

(56) References Cited

U.S. PATENT DOCUMENTS

| | | | | |
|---|---|---|---|---|
| 5,703,665 A * | 12/1997 | Muramatsu et al. | ............ | 349/60 |
| 2005/0236548 A1 | 10/2005 | Maruta | ......................... | 248/476 |
| 2006/0012962 A1 | 1/2006 | Obata | | |
| 2008/0309843 A1 | 12/2008 | Matsutani et al. | | |

FOREIGN PATENT DOCUMENTS

| | | |
|---|---|---|
| EP | 1 933 555 A1 | 6/2008 |
| EP | 1 940 162 A2 | 7/2008 |
| JP | 2007-293129 A | 11/2007 |
| JP | 2008-309890 A | 12/2008 |

OTHER PUBLICATIONS

EP Office Action dated Feb. 28, 2012 from corresponding EP Application No. 10 152 414.8.

* cited by examiner

*Primary Examiner* — James Dudek

(74) *Attorney, Agent, or Firm* — Morgan, Lewis & Bockius LLP

(57) ABSTRACT

The present invention relates to a cabinet structure for a display apparatus such as a liquid crystal television. The cabinet structure of a display apparatus 1 is provided with: a liquid crystal module 3 provided with a liquid crystal panel 31; a front cabinet 2 that has an open window portion through which a display screen of the liquid crystal panel is exposed; and a rear cabinet that is joined to the front cabinet to form a cabinet main body in which the liquid crystal module is accommodated, and the liquid crystal module 3 is fitted to the front cabinet 2, in a state in which a convex-curved press rib 4 that is curved along a length direction thereof to be convex is pressed against a bezel 32 of the liquid crystal module 3. Thus, a simpler cabinet structure for a display apparatus is achieved that is capable of realizing a preferable appearance of the display screen of the liquid crystal panel and the cabinet when they are assembled together, and that is capable of preventing the occurrence of vibration noise.

4 Claims, 2 Drawing Sheets

CABINET STRUCTURE FOR DISPLAY APPARATUS

This application is based on Japanese Patent Application No. 2009-025602 filed on Feb. 6, 2009, the contents of which are hereby incorporated by reference.

BACKGROUND OF THE INVENTION

1. Field of the Invention

The present invention relates to a cabinet structure for a display apparatus such as a liquid crystal television.

2. Description of Related Art

A conventional cabinet structure for a display apparatus such as a liquid crystal television is such that a liquid crystal module provided with a liquid crystal panel is fitted in a box-shaped cabinet composed of a front cabinet and a rear cabinet. In the front cabinet, there is provided an open window portion through which a display screen of the liquid crystal panel is exposed.

The liquid crystal module is built as a unit provided with components such as a liquid crystal panel, a drive circuit for driving the liquid crystal panel, a tuner for receiving a broadcast signal, and a circuit board having, for example, a control circuit for controlling various parts mounted thereon. Such a liquid crystal module is screwed to a fitting boss provided in the front cabinet.

In fitting the liquid crystal module in the front cabinet, a press rib provided on the front-cabinet side is pressed against a bezel provided along the outer circumferential edge of the display screen of the liquid crystal panel, and then the liquid crystal module is screwed to the fitting boss.

The front cabinet is made of resin, and thus deformation such as warp or flexure may occur in the front cabinet. Deformation occurred in the front cabinet leads to undulation in the length direction of the press rib, which causes a gap to occur between the liquid crystal module and the press rib. Such a gap causes vibration noise. A gap between the liquid crystal module and the press rib will cause a gap to occur between the liquid crystal panel and the front cabinet, and this deteriorates the appearance of the apparatus. Furthermore, vibration noise annoys the audience, and thus further deteriorates the commercial value of the apparatus.

To cope with this, there have already been filed patent applications for the following inventions: a cabinet structure in which cabinet deformation and vibration noise are prevented by providing moment force generation means that is integrally formed with a front cabinet to generate a moment force to bring an open window portion on the front-cabinet side into a close contact with the liquid crystal-panel side in the fabrication process, to thereby improve the appearance of the front cabinet and the display screen of the liquid crystal panel when they are assembled together (see, for example, the Patent Literature JP-A-2007-293129); and a display apparatus structured such that an end of a press rib is formed narrower toward the end such that the press rib and a liquid crystal module are in a close contact with each other in a line-contact manner, to thereby prevent a gap from occurring between the liquid crystal module and the press rib to cause vibration noise (see, for example, the Patent Literature JP-2008-309890).

It is possible, in fitting the liquid crystal module to the front cabinet, to generate a moment force to bring the open window portion on the front-cabinet side into a close contact with the liquid crystal-panel side, but, if the liquid crystal panel is pressed too strongly, strain may occur in the liquid crystal screen. Furthermore, since the moment force generation means needs to be disposed in a predetermined position, the structure cannot be a simple one. Hence, there has been a need for a simpler cabinet structure capable of improving the appearance of the display screen of a liquid crystal panel and a cabinet when they are assembled together, and also capable of preventing occurrence of vibration noise.

Also, it is possible to form the press rib in a shape that is narrower toward its end (tapered toward its end) and bring the press rib into a close contact with the liquid crystal module, but with respect to display apparatuses such as liquid crystal televisions that have been increasing in size, it is difficult to follow the modification of a wide front cabinet and bring a press rib into a uniform contact with the wide front cabinet by using a method of simply bringing the press rib into a close contact with the front cabinet in a line-contact manner.

Thus, a simpler cabinet structure is needed in which the gap between the front cabinet and the liquid crystal panel is made uniform such that a preferable appearance of the liquid crystal panel and the front cabinet can be achieved when they are assembled together, and such that, even when the cabinet structure is applied to a display apparatus having a large display screen, vibration noise can be effectively prevented from occurring where the front cabinet and the liquid crystal module are in contact with each other.

SUMMARY OF THE INVENTION

In view of the above problems, an object of the present invention is to provide a simpler cabinet structure for a display apparatus that is capable of achieving a preferable appearance of the display screen of the liquid crystal panel and the cabinet when they are assembled together, and that is also capable of effectively preventing the occurrence of vibration noise.

To achieve the above object, according to the present invention, a cabinet structure for a display apparatus is provided with: a liquid crystal module provided with a liquid crystal panel; a front cabinet that has an open window portion through which a display screen of the liquid crystal panel is exposed, that is provided with a press rib formed in four sides of the front cabinet surrounding the open window portion of the front cabinet as a convex-curved press rib, the convex-curved press rib being in contact with a bezel provided along an outer circumferential edge of the liquid crystal panel, and the convex-curved press rib being curved along a length direction of the convex-curved press rib to be convex, and to which the liquid crystal module is fitted, with the bezel pressed against the convex-curved press rib that is curved to be convex; and a rear cabinet that is joined to the front cabinet to form a cabinet main body in which the liquid crystal module is accommodated.

With this structure, when the liquid crystal panel, which is flat, is fitted to the front cabinet, a middle portion of the convex-curved press rib in a length direction thereof is strongly pressed against the bezel without nonuniformity in gap width. As a result, the gap between the liquid crystal panel and the open window portion of the front cabinet is uniform, which contributes to a preferable appearance. Furthermore, since the middle portion of the convex-curved press rib in the length direction thereof is strongly pressed against and fixed to the bezel, vibration noise is less likely to occur at a contact portion where the front cabinet and the liquid crystal module are in contact with each other. This makes it possible to obtain a cabinet structure for a display apparatus that has a preferable appearance after assembly and that is capable of preventing the occurrence of vibration noise even when the structure is applied to a display apparatus having a large-screened liquid crystal panel.

According to the present invention, it is preferable that the above described cabinet structure for a display apparatus be further provided with: a plurality of fitting bosses provided at predetermined intervals outside the press rib on a rear surface of the front cabinet; and a fitting member provided on a side of the liquid crystal module to protrude therefrom to be engaged with the fitting bosses. Here, the liquid crystal module is fixed to the front cabinet by fixing the fitting member to the fitting bosses by screwing screws engaged in the fitting member into screw holes formed in the fitting bosses, with the convex-curved press rib pressed against the bezel by strongly pressing a middle portion of the convex-curved press rib in a length direction thereof With this structure, since the screwing is achieved in a state in which the convex-curved press rib is pressed against the bezel of the liquid crystal module, no gap occurs at a fitting portion where the liquid crystal module and the front cabinet are fitted to each other, even if deformation such as warp occurs in the cabinet which is made of resin, and this leads to a cabinet structure that has a preferable appearance and that is free from vibration noise. Thus, a cabinet structure for a display apparatus can be obtained that is capable of realizing a preferable appearance after assembly and that is also capable of preventing the occurrence of vibration noise, even when the structure is applied to a display apparatus having a large-screened liquid crystal panel.

According to the present invention, in the above cabinet structure for a display apparatus, it is preferable that the convex-curved press rib be curved to a degree that does not cause strain in the display screen of the liquid crystal panel. With this structure, no strain occurs in the display screen even if the middle portion of the convex-curved press rib in the length direction thereof is strongly pressed against the bezel, and thus can be realized a cabinet structure for a liquid crystal panel that has a preferable appearance and that is free from vibration noise.

According to the present invention, in the above cabinet structure for a display apparatus, it is preferable that a contact portion of the open window portion at which the open window portion is in contact with the liquid crystal panel be formed as a curved window portion that is curved to a same degree as the convex-curved press rib. With this structure, a gap between the open window portion and the liquid crystal panel is uniform, and this helps realize a cabinet structure for a liquid crystal panel that has a preferable appearance.

According to the present invention, in the above cabinet structure for a display apparatus, it is preferable that a contact portion of the convex-curved press rib be tapered toward an end thereof. With this structure, the press rib can be easily brought into a close contact with the liquid crystal module, and thus, even when the press rib is formed as a convex-curved press rib, the liquid crystal panel can be brought into a close contact with the press rib without a gap in the length direction of the press rib.

According to the present invention, in the above cabinet structure for a display apparatus, it is preferable that the convex-curved press rib be curved to a degree that does not cause strain in the display screen of the liquid crystal panel, that a contact portion of the open window portion at which the open window portion is in contact with the liquid crystal panel be formed as a curved window portion that is curved to a same degree as the convex-curved press rib, and that a contact portion of the convex-curved press rib be tapered toward an end thereof. With this structure, the press rib can be easily brought into a close contact with the liquid crystal module, and this helps realize a cabinet structure for a liquid crystal panel that has a preferable appearance and that is free from vibration noise.

DETAILED DESCRIPTION OF PREFERRED EMBODIMENTS

Hereinafter, embodiments of the present invention will be described with reference to the drawings. The same components will be identified by common reference signs, and detailed description of them will be omitted if possible. This embodiment relates to a cabinet structure for a display apparatus, the cabinet structure being provided with: a liquid crystal module provided with a liquid crystal panel; a front cabinet that is provided with an open window portion through which a display screen of the liquid crystal panel is exposed; and a rear cabinet that is joined to the front cabinet to form a cabinet main body in which the liquid crystal module is accommodated.

Figure 1:
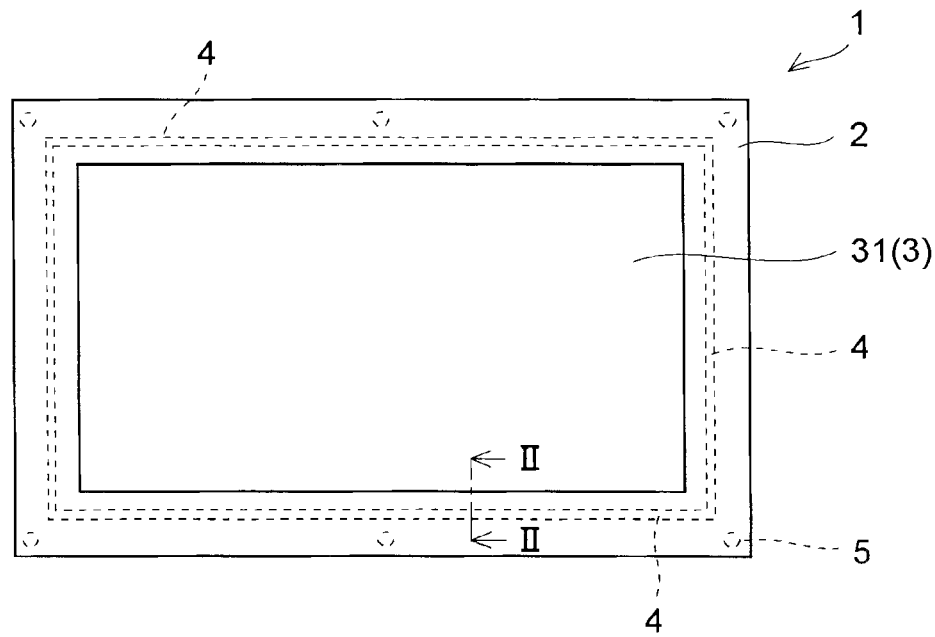
FIG. 1 is a front view showing an example of a display apparatus provided with a cabinet structure according to the present invention.

The display apparatus 1 of this embodiment is a display apparatus using a liquid crystal panel, and is provided with, as shown in FIG. 1, a front cabinet 2 and a liquid crystal module 3 that forms a display screen by exposing a liquid crystal panel 31 through an open window portion of the front cabinet 2. In addition, a rear cabinet (not shown) is fitted to the rear side of the front cabinet 2. That is, the display apparatus 1 has a cabinet structure provided with the liquid crystal module 3 provided with the liquid crystal panel 31, a front cabinet 2 provided with an open window portion through which the display screen of the liquid crystal panel 31 is exposed, and a rear cabinet that is united with the front cabinet 2 to form the cabinet main body in which the liquid crystal module 3 is accommodated.

The liquid crystal module 3 is built as a unit provided with, in addition to the liquid crystal panel 31, a drive circuit for driving the liquid crystal panel 31, a tuner for receiving a broadcast signal, a circuit board on which, for example, a control circuit for controlling various portions is mounted, and the like. Furthermore, a bezel is provided along an outer circumferential edge of the liquid crystal panel 31, and a press rib that is in contact with the bezel is provided in four sides of the front cabinet 2 surrounding the open window portion of the front cabinet 2. A description will be given of this cabinet structure with reference to FIGS. 2, 3A, 3B, and 3C.

Figure 2:
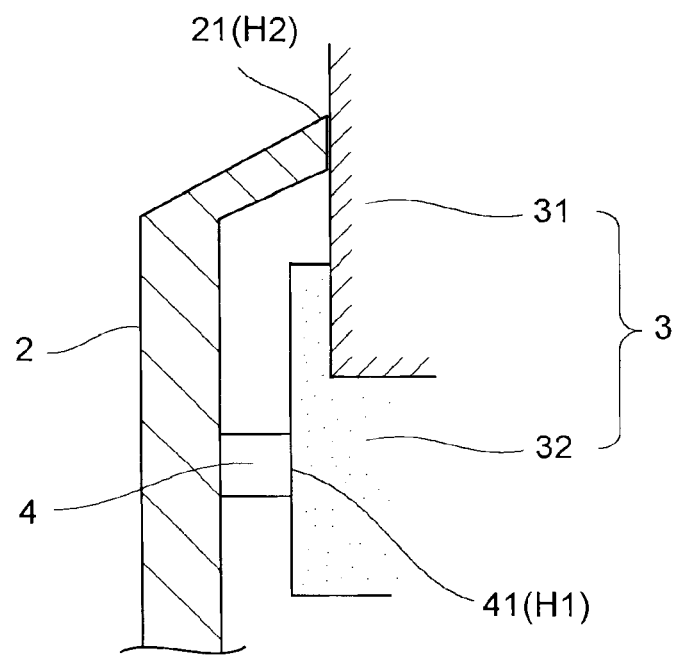
FIG. 2 is an enlarged sectional view taken along line II-II in FIG. 1, showing a principal part of a cabinet structure for a display apparatus according to the present invention.

FIG. 2 is a sectional view taken along line II-II of FIG. 1, showing that the front cabinet 2 and the liquid crystal module 3 are fixed to each other in a state in which the press rib 4 provided in the four sides surrounding the open window portion of the front cabinet 2 is in contact with the bezel 32 provided along the outer circumferential edge of the liquid crystal panel 31.

The cabinet structure of this embodiment is one for a display apparatus that helps achieve a preferable appearance of the liquid crystal panel 31 and the cabinet when they are assembled together, and that even helps prevent occurrence of vibration noise. The press rib 4 is formed as a convex-curved press rib whose contact portion 41 at which the press rib 4 is in contact with the bezel 32 is curved along the length direction of the convex-curved press rib to be convex.

The liquid crystal module 3 may be fitted to the cabinet main body by using an engagement method or by using a screw-fixing method as will be described later, as long as the liquid crystal module 3 is fixed to the cabinet main body in a state in which the bezel 32 is pressed against the convex-curved press rib 4 provided in the front cabinet 2. However, the screw-fixing method is preferable because it facilitates the fitting operation, and also because the fastening force can be adjusted by using a washer or a spacer having a proper thickness.

The press rib 4 is curved along the length direction thereof to be convex (see FIGS. 3A and 3B), and the convex-curved portion is pressed against the bezel 32. Thus, the bezel 32 formed in a straight-line manner in the liquid crystal module 3 and the press rib 4 are in contact with each other not in a straight line-straight line contact manner but in a straight line-curved line contact manner. As a result, the middle portion of the press rib 4 in the length direction thereof can be securely pressed against the bezel 32. The convex-curved portion here is preferably curved to a degree that does not cause strain in the display screen of the liquid crystal panel 31, and in this embodiment, the convex-curved portion is convex such that a convex height H1 is on the order of 0.5 mm with respect to a 22-inch liquid crystal panel. With this structure, no distortion or no strain occurs in the display screen of the liquid crystal panel 31 even if the middle portion of the convex-curved press rib 4 in the length direction thereof is strongly pressed against the bezel 32, and this results in a cabinet structure for the liquid crystal module that is free from vibration noise.

As described above, by curving the convex-curved press rib 4 to a degree that does not cause strain in the display screen of the liquid crystal panel 31 (with H1 not greater than 1 mm, preferably on the order of 0.5 mm), it is possible to prevent strain from occurring in the display screen even if the middle portion of the convex-curved press rib 4 in the length direction thereof is strongly pressed against the bezel 32, and this helps obtain a cabinet structure for a liquid crystal panel that is free from vibration noise.

It is preferable that the convex-curved press rib 4 be curved such that the convex height H1 is not greater than 1 mm, and with respect to a large-screened liquid crystal panel, since large warp or large strain occurs in the front cabinet 2 that is a resin product, it is preferable that the convex-curved press rib 4 be curved such that the convex height H1 is a little large; for example, the convex height H1 is preferably on the order of 0.8 mm for a 32-inch liquid crystal panel.

Also, in the above structure, it is preferable that the contact portion 21 of the open window portion of the front cabinet 2 at which the front cabinet 2 is in contact with the liquid crystal panel 31 be formed as a curved window portion that is curved to the same degree as the convex-curved press rib 4. With this structure, a circumferential surface of the contact portion 21 of the front cabinet 2 and a circumferential surface of the contact portion 41 of the press rib 4 are parallel to each other. Thus, the gap between the open window portion and the liquid crystal panel is uniform, and this leads to a cabinet structure for a liquid crystal panel having a preferable appearance. To achieve this, for example, in a case in which the convex height H1 of the contact portion 41 of the press rib 4 is 0.5 mm, a convex height H2 of the contact portion 21 is also set to be on the order of 0.5 mm, such that the circumferential surface of the contact portion 21 of the front cabinet 2 and the circumferential surface of the contact portion 41 of the press rib 4 are substantially parallel to each other.

Furthermore, in the above structure, it is preferable that the contact portion 41 of the convex-curved press rib 4 be tapered toward an end thereof. With this structure, the tapered contact portion 41 is pressed against the bezel 32 in a line-contact manner, and thus the press rib 4 can be easily brought into a close contact with the liquid crystal module 3. This makes it possible, even with the convex-curved press rib, to bring the liquid crystal panel into a close, gapless contact with the press rib 4 in the length direction of the press rib 4.

The liquid crystal module 3 can be fixed to the front cabinet 2 via a fitting member provided on a side of the liquid crystal module 3. In this embodiment, a plurality of fitting members are provided protruding from sides of the liquid crystal module 3, and these protruding fitting members are fixed, with screws, to fitting bosses provided in the front cabinet 2. This structure will be described with reference to FIGS. 3A, 3B, and 3C.

Figure 3A:
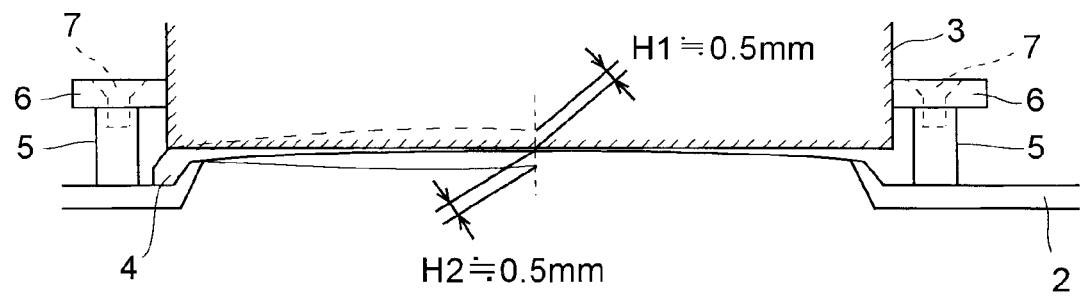
FIG. 3A is a schematic diagram for illustrating how a liquid crystal module and a convex-curved press rib are in contact with each other.

As shown in FIG. 3A, a plurality of fitting bosses 5 for fitting the liquid crystal module 3 are provided in the four sides of the front cabinet 2 surrounding the open window portion of the front cabinet 2 to be located outside the press rib 4. In the fitting bosses 5, screw holes into which screws 7 are to be screwed are formed, and the fitting members 6 protruding from the sides of the liquid crystal module 3 are fixed to the fitting bosses 5 with the screws 7.

It is preferable that the fitting boss 5 be provided in plurality at predetermined intervals on a rear surface of the front cabinet 2; for example, at four positions in four corners in the four sides of the front cabinet 2 surrounding the open window portion. Or, as shown in FIG. 1, two positions in the middle of the longer sides of the front cabinet 2 may be added to the four positions in the four corners such that the fitting bosses 5 are provided at six positions.

Also, the fitting bosses 5 are fixed to the fitting members 6, with the convex-curved press rib 4 pressed against the bezel 32, by strongly pressing the middle portion of the convex-curved press rib 4 in the length direction thereof and screwing screws 7 engaged in the fitting members 6 into screw holes formed in the fitting bosses 5.

Figure 3B:
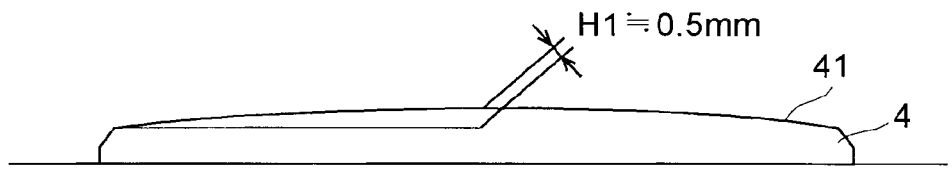
FIG. 3B is a schematic diagram for illustrating a convex-curved press rib.

Since the front cabinet 2 and the liquid crystal module 3 are fixed to each other with screws at least at the four corners in the four sides via the fitting bosses 5 and the fitting members 6, the four corners of the liquid crystal module 3 can be fixed without rattle. Also, since the press rib 4 is formed as the convex-curved press rib whose middle portion in the length direction protrudes (for example, such that the convex height H1 is 0.5 mm as shown in FIG. 3B), the middle portion of the press rib 4 first comes in contact with the liquid crystal module 3, and a structure is realized in which a gap is less likely to occur.

Thus, even when the four corners are fixed with screws, the fixation is achieved with the middle portion of the press rib 4 in the length direction thereof pressed against the liquid crystal module 3, and this results in a structure in which vibration noise is less likely to occur even if vibration is applied to the liquid crystal module 3. Furthermore, when the six positions including the four positions in the four corners and the two positions in the middle portions of the longer sides are fixed with screws, even if the liquid crystal panel is a large-sized horizontally-long one, since the two middle portions are securely fixed, it is possible to effectively prevent vibration noise from occurring where the front cabinet 2 and the liquid crystal module 3 are in contact with each other.

Figure 3C:
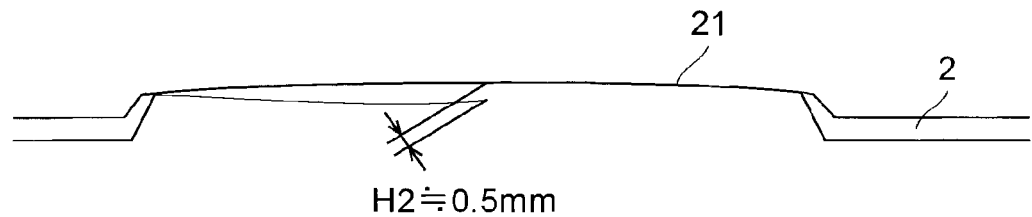
FIG. 3C is a schematic diagram for illustrating an open window portion of a front cabinet.

Also, since the press rib 4 is formed as the convex-curved press rib whose middle portion in the length direction protrudes, even if deformation such as warp occurs in the cabinet which is made of resin, a gap is less likely to occur at the middle portion of a fitting portion at which the liquid crystal module 3 and the front cabinet 2 are fitted to each other. Here, as shown in FIG. 3C, by forming the contact portion 21, at which the open window portion of the front cabinet 2 is in contact with the liquid crystal panel 31, as a curved window portion that is curved to the same degree as the contact portion 41 of the press rib 4, that is, with the convex height H2 set to 0.5 mm, the gap between the open window portion and the liquid crystal panel 31 can be made uniform. This results in a preferable appearance. Thus, even with a liquid crystal panel having a large screen size, a cabinet structure can be obtained that is capable of realizing a preferable appearance after assembly and that is also capable of preventing vibration noise, by using a simple structure in which the contact portion with respect to the liquid crystal module 3 is formed in a convex-curved shape.

As described above, with the cabinet structure according to the present invention, the liquid crystal module is fitted to the front cabinet in a state in which the convex-curved press rib that is curved along the length direction to be convex is pressed against the bezel of the liquid crystal module. This makes it possible to fix the flat liquid crystal panel to the front cabinet with the middle portion of the convex-curved press rib in the length direction thereof strongly pressed against the bezel. Thus, the middle portion of the convex-curved press rib is pressed against the bezel, allowing no gap to occur at the fitting portion where the liquid crystal module and the front cabinet are fitted to each other. This helps achieve a structure where vibration noise is less likely to occur. Furthermore, since the gap between the liquid crystal panel and the open window portion of the front cabinet can be made uniform, a preferable appearance can be achieved. Thus, even with a liquid crystal panel having a large screen size, a cabinet structure can be obtained that is capable of realizing a preferable assembly appearance and that is also capable of preventing occurrence of vibration noise, by using a simple structure in which the press rib is formed in a convex-curved shape.

Furthermore, as a result of making the convex-curved press rib curve to a degree that does not cause strain in the display screen of the liquid crystal panel and making the contact portion of the open window portion at which it is in contact with the liquid crystal panel curve to the same degree as the convex-curved press rib, no strain occurs in the display screen even when the middle portion of the press rib is strongly pressed against the bezel, which leads to a vibration-noise-free cabinet structure, and moreover, the gap between the open window portion and the liquid crystal panel is uniform, which helps realize a cabinet structure for a liquid crystal panel having a preferable appearance.

Thus, the cabinet structure for a display apparatus according to the present invention can be preferably applied to display apparatuses that use liquid crystal panels, which have been increasing in size. Furthermore, the cabinet structure, which is simple and thus can be easily put into commercial production, is preferable for production of liquid crystal display apparatuses, for which a large demand exists.

What is claimed is:

1. A cabinet structure for a display apparatus, comprising:
a liquid crystal module provided with a liquid crystal panel;
a front cabinet
that has an open window portion through which a display screen of the liquid crystal panel is exposed,
that is provided with a press rib formed in four sides of the front cabinet surrounding the open window portion of the front cabinet as a convex-curved press rib, the convex-curved press rib being in contact with a bezel provided along an outer circumferential edge of the liquid crystal panel, and the convex-curved press rib being curved along a length direction of the convex-curved press rib to be convex, and
to which the liquid crystal module is fitted, with the bezel pressed against the convex-curved press rib that is curved to be convex;
a rear cabinet that is joined to the front cabinet to form a cabinet main body in which the liquid crystal module is accommodated;
fitting bosses which are disposed at a plurality of positions outside the press rib on a rear surface of the front cabinet which surrounds the open window portion, including at least four corners in four sides of the front cabinet; and
a fitting member provided on a side of the liquid crystal module to protrude therefrom to be engaged with the fitting bosses,
wherein
the fitting bosses that are provided at the four corners in the four sides of the front cabinet are each disposed at an intersection point of a virtual line extending outside and parallel to a vertical portion of the press rib and a virtual line extending outside and parallel to a horizontal portion of the press rib;
the front cabinet is provided with a contact portion which is in contact with the liquid crystal panel when the press rib is fixedly pressed against the bezel; and
the liquid crystal module is fixed to the front cabinet by fixing the fitting member to the fitting bosses by screwing screws engaged in the fitting member into screw holes formed in the fitting bosses, with the convex-curved press rib pressed against the bezel by strongly pressing a middle portion of the convex-curved press rib in a length direction thereof.

2. The cabinet structure for a display apparatus according to claim 1, wherein
the convex-curved press rib is curved to a degree that does not cause strain in the display screen of the liquid crystal panel when a middle portion of the press rib in a length direction thereof is pressed against the bezel.

3. The cabinet structure for a display apparatus according to claim 1, wherein
a contact portion of the open window portion at which the open window portion is in contact with the liquid crystal panel is formed as a curved window portion that is curved to a same degree as the convex-curved press rib.

4. The cabinet structure for a display apparatus according to claim 1, wherein
a contact portion of the convex-curved press rib is tapered toward an end thereof.

* * * * *